United States Patent [19]

Mahaffey

[11] Patent Number: 4,556,247
[45] Date of Patent: Dec. 3, 1985

[54] PORTABLE ELECTRIC GENERATOR FOR A VEHICLE

[76] Inventor: John M. Mahaffey, 1396 Calle Yucca, Thousand Oaks, Calif. 91360

[21] Appl. No.: 529,118

[22] Filed: Sep. 2, 1983

[51] Int. Cl.$^4$ ................................................ B60P 3/34
[52] U.S. Cl. ................................. 296/24 R; 296/181; 322/1
[58] Field of Search ............... 296/24 R, 10, 181, 100, 296/101; 322/1; 320/61-64; 180/2.1, 14.3

[56] References Cited

U.S. PATENT DOCUMENTS

| | | | |
|---|---|---|---|
| 1,924,462 | 8/1933 | Scofield | 322/1 X |
| 2,530,578 | 11/1950 | Hotop | 296/24 R |
| 2,714,527 | 8/1955 | Thompson | 296/100 X |
| 2,898,542 | 8/1959 | Wasko et al. | 322/1 X |
| 3,656,044 | 4/1972 | King | 320/61 X |
| 3,734,540 | 5/1973 | Thiermann | 296/24 R X |
| 3,977,720 | 8/1976 | Schreiberg | 296/181 |
| 4,133,572 | 1/1979 | Robbins et al. | 296/24 R X |
| 4,406,493 | 9/1983 | Albrecht et al. | 296/100 |

Primary Examiner—Robert B. Reeves
Assistant Examiner—Russell D. Stormer
Attorney, Agent, or Firm—Jack C. Munro

[57] ABSTRACT

A portable electric generator for a recreational land wheeled vehicle in the form of a trailer unit which is connected to the vehicle and towed thereby. The generator is to be activatable from within the vehicle and can be operated during movement of the vehicle.

1 Claim, 4 Drawing Figures

PORTABLE ELECTRIC GENERATOR FOR A VEHICLE

BACKGROUND OF THE INVENTION

The field of this invention relates to recreational equipment and more particularly to a motor operated recreational van to which is to be connected a towable trailer which includes an internal combustion engine operating electrical generator which is to be used to operate electrical equipment within the vehicle during operation of the vehicle.

Recreational vehicles are in extremely common use at the present time. A typical recreational vehicle has an interior which is furnished in the form of living quarters. The living quarters are normally sufficient to perform normal daily functions, such as, cooking meals, dining and sleeping.

Included within a typical recreational vehicle, there will be located various types of electrically operated appliances. Typical appliances would be, a refrigerator, stove and an air conditioner. These appliances are normally driven either by batteries or an outside power source. However, the operator normally has to be cautious in the operating of the electrical equipment in order to avoid running down of the batteries which will necessitate recharging of the batteries. Therefore, on an extended trip, the operator may find it necessary to, for example, only operate a particular appliance a limited amount of time or else there will be no battery power left to operate the totally necessary electrical appliances.

It has been known that one could obtain an internal combustion engine electrical generator and use that generator to operate the electrical equipment located within the vehicle and also to use that generator to recharge the batteries that are used to operate that equipment. However, such an electrical generator is quite substantial in size. Therefore, to include that generator within the recreational vehicle will cause a significant amount of loss of space within the recreational vehicle. This loss of space takes away from the available living space within the recreational vehicle. Also, such a generator is quite heavy so to include such within the recreational vehicle substantially adds to the overall weight of the recreational vehicle. Therefore, in the past it has just not been feasible to include an electrical generator in conjunction with a recreational vehicle.

SUMMARY OF THE INVENTION

The primary objective of the present invention is to find that it is feasible to include an internal combustion engine operated electrical generator in conjunction with a recreational vehicle.

Another objective of this invention is to mount the generator in a structure which is separately located from the recreational vehicle so that the generator itself does not add overall weight to or take away space from the recreational vehicle.

The structure of the present invention relates to the constructing of a trailer which is formed of a housing, within which is located a plurality of separate compartments. Within one of the compartments is to be mounted an internal combustion engine operated electrical generator. This generator is continuously electrically connected to appropriate electrical circuitry located within a recreational vehicle. The trailer is to be towed by appropriate towing hitch mechanism to the recreational vehicle. The cover is associated with the housing. The cover is movable between an open position and a closed position. The cover is mounted across an enlarged access opening into the housing permitting entry into different compartments of the plurality of compartments. Also, included within the housing are a plurality of separate access doors permitting individual access into different compartments.

DETAILED DESCRIPTION OF THE SHOWN EMBODIMENT

Figure 1:
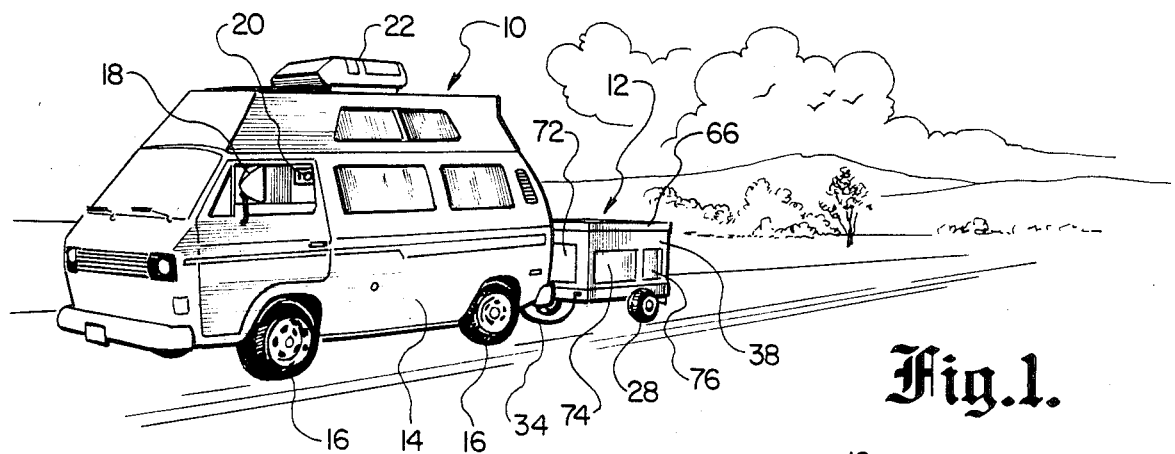
FIG. 1 is an isometric view of a recreational vehicle to which has been connected the trailer of the present invention.

Referring particularly to the drawing, there is shown a typical recreational van to which is attached the trailer 12 of the present invention. The recreational vehicle 10 includes a body 14 upon which is mounted a plurality of wheels 16. Within the body 14 there is an internal compartment 18. Within the internal compartment 18 there is mounted a control switch assembly 20. It is to be understood that the recreational vehicle 10 will normally include different types of electrically operated appliances such as the air conditioning unit 22 shown mounted on the top of the recreational vehicle 10. The trailer 12 includes a frame 24 which is mounted on an axle 26. At each end of the axle 26 there are mounted wheels 28.

Connected to the frame 14 is a tow bar 30. The tow bar 30 is connected to a hitching mechanism 32. The hitching mechanism 32 is connected with an appropriate ball hitch (not shown) which is mounted on the back end of the recreational vehicle 10.

Extending from the recreational vehicle 10 is a electrical conductor 34. Electrical conductor 34 connects to an electrically connecting socket assembly 36 which is mounted on the trailer housing 38. The trailer housing 38 is to be constructed of a rigid material such as wood, fiberglass or other similar material.

The trailer housing 38 has an internal chamber which is divided into a plurality of separate compartments 40, 42, 44, 46, 48 and 50. It is to be understood that it is within the scope of this invention that additional compartments may be added, or a smaller number of compartments utilized. It is to be noted that compartment 50 is located beneath compartment 48 with there being a divider flooring 52 located therebetween. Separating the compartments 40 and 42 is also a divider flooring 54. Located beneath the compartment 44 is another compartment which is separated by a divider flooring 56. There is also a compartment (not shown) located beneath the compartment 46 which is separated by divider flooring 58. The divider flooring 58 includes an access door 60 to gain access into the compartment located beneath the compartment 46.

Within the compartment 40, there is mounted an internal combustion engine electrical generator 62. The generator 62 is to be driven by gasoline which can be contained within a tank 64, which is located within the compartment 50.

Figure 2:
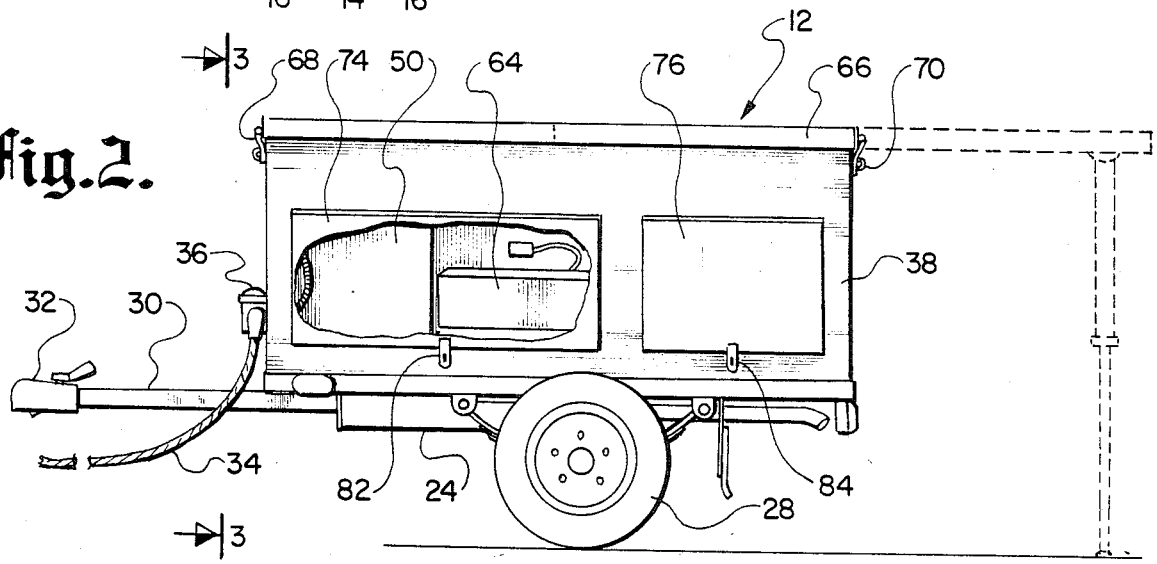
FIG. 2 is a side elevational view, partly cut away, of the trailer of the present invention.
Figures 3, 4:
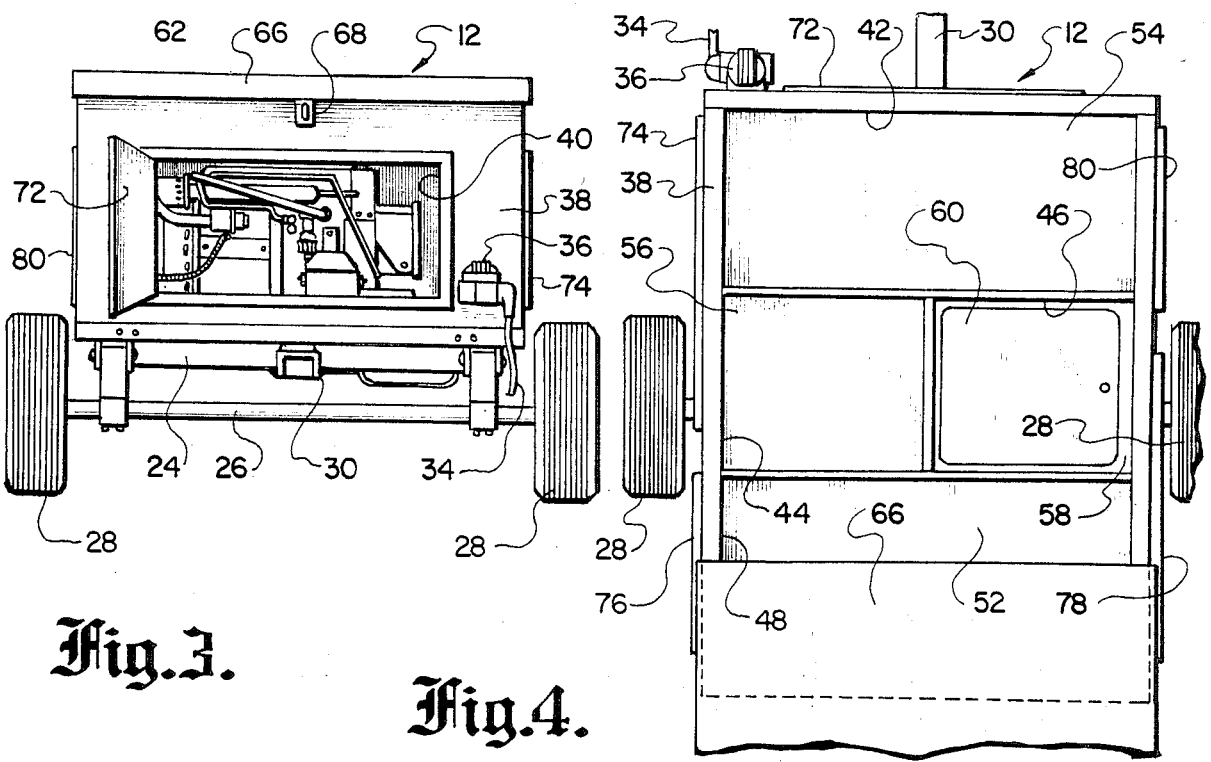
FIG. 3 is a front end view of the trailer of the present invention showing the access door to the compartment within which is located the electrical generator showing the access door in an open position.
FIG. 4 is a top view of the trailer of the present invention showing the cover in the partially open position in order to gain access into a plurality of the separate compartments contained within the housing of the trailer.

Mounted on the housing 38 and covering the compartments 42, 44, 46 and 48 is a top cover 66. The top cover 66 is to be lockable in a closed position as shown in FIG. 2 of the drawings by means of hatch assemblies 68 and 70. It is to be understood that upon release of the locking mechanism associated with the hatch assemblies 68 and 70, that the cover 66 can be slid to the dotted line position shown in FIG. 2, gaining access into compartments 42, 44, 46 and 48. Also, cover 66 can be completely removed from the housing 38.

To gain access through the side wall of the housing 38 there is utilized a plurality of access doors 72, 74, 76, 78 and 80. Each of these access doors provide lateral access to a single compartment, such as door 72 for compartment 40 and door 74 for compartment 50. Normally, each of the access doors will be locked within a closed position through the use of a locking assembly 82 with access door 50 and with locking assembly 84 with access door 76. It is to be understood that each of these access doors are hingedly connected to the housing 38.

What is claimed is:

1. In combination with a motor operated wheeled land vehicle having an internal compartment, accessory electrically operated equipment attached to said vehicle, a trailer connected to said vehicle but spaced therefrom to be towed thereby as said wheeled land vehicle is operated, said trailer comprising:

a housing having an internal chamber, said internal chamber being divided into a plurality of separate compartments, said housing including a plurality of separate access doors, each said access door facilitating access into a single said separate compartment, said housing including a top, said top being movable relative to said housing from a closed position to an open position permitting access into a plurality of said compartments of said internal chamber; and an internal combustion engine electrical generator being located within one of said separate compartments, switch means mounted within said internal compartment of said wheeled land vehicle, an electrical conductor connecting said switch means and said generator, said generator being activatable by said switch means, said generator being operable during movement of said vehicle, said accessory electrically operated equipment of said wheeled land vehicle being connected to said generator to be operated thereby.

* * * * *